United States Patent
Choksi (10) Patent No.: US 6,978,144 B1
(45) Date of Patent: Dec. 20, 2005

(54) METHOD AND SYSTEM FOR MANAGING REAL-TIME BANDWIDTH IN A WIRELESS NETWORK

(75) Inventor: Ojas T. Choksi, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 610 days.

(21) Appl. No.: 09/839,833

(22) Filed: Apr. 19, 2001

(51) Int. Cl.[7] .............................................. H04Q 7/20
(52) U.S. Cl. .............................. 455/452.2; 455/452.1; 455/450; 370/468; 370/329
(58) Field of Search ........................ 455/452.1–452.2, 455/453, 450, 437, 436, 517; 370/229–230, 370/235, 395.21, 341, 468, 329

(56) References Cited

U.S. PATENT DOCUMENTS

| | | | | |
|---|---|---|---|---|
| 5,884,174 A | * | 3/1999 | Nagarajan et al. | 455/436 |
| 5,903,843 A | * | 5/1999 | Suzuki et al. | 455/452.2 |
| 6,031,845 A | * | 2/2000 | Walding | 370/468 |
| 6,052,594 A | * | 4/2000 | Chuang et al. | 455/452.2 |
| 6,097,733 A | * | 8/2000 | Basu et al. | 370/468 |
| 6,108,552 A | * | 8/2000 | Edwards et al. | 455/452.1 |
| 6,216,006 B1 | * | 4/2001 | Scholefield et al. | 455/450 |
| 6,275,695 B1 | * | 8/2001 | Obhan | 455/423 |
| 6,314,293 B1 | * | 11/2001 | Servi et al. | 455/450 |
| 6,366,761 B1 | * | 4/2002 | Montpetit | 455/12.1 |
| 6,374,112 B1 | * | 4/2002 | Widegren et al. | 455/452.2 |
| 6,400,954 B1 | * | 6/2002 | Khan et al. | 455/452.2 |
| 6,407,999 B1 | * | 6/2002 | Olkkonen et al. | 370/389 |
| 6,469,993 B1 | * | 10/2002 | Seo et al. | 370/329 |
| 6,606,311 B1 | * | 8/2003 | Wang et al. | 370/338 |
| 6,628,954 B1 | | 9/2003 | McGowan et al. | 455/461 |
| 6,665,718 B1 | | 12/2003 | Chuah et al. | 709/225 |
| 6,674,733 B1 | * | 1/2004 | Huusko | 370/329 |
| 6,675,208 B1 | | 1/2004 | Rai et al. | 709/224 |
| 2002/0128017 A1 | * | 9/2002 | Virtanen | 455/452 |
| 2003/0050070 A1 | * | 3/2003 | Mashinsky et al. | 455/452 |

* cited by examiner

Primary Examiner—Nick Corsaro
Assistant Examiner—Sharad Rampuria
(74) Attorney, Agent, or Firm—Baker Botts L.L.P.

(57) ABSTRACT

A method and system for managing real-time bandwidth request in a wireless network includes receiving a request for a connection for bandwidth of a cell of a wireless network. A subscription level associated with a connection is determined. The request for the connection is processed based on the subscription level.

36 Claims, 6 Drawing Sheets

METHOD AND SYSTEM FOR MANAGING REAL-TIME BANDWIDTH IN A WIRELESS NETWORK

TECHNICAL FIELD OF THE INVENTION

The present invention relates generally to the field of wireless communications, and more particularly to a method and system for managing real-time bandwidth request in a wireless network.

BACKGROUND OF THE INVENTION

Traditional wireless networks include a number of base stations (BTS) and one or more mobile switching centers (MSC)/base station controllers (BSC). The BTSs each cover a geographic region, or cell of the wireless network and communicate with mobile telephones in the cell. The MSCs/BSCs provide switch and soft handoff functionality for the wireless network. To support data calls, wireless networks typically include a data interworking function (IWF). The IWF connects the wireless network to the Internet or other data network.

Each cell of a wireless network is able to support a certain number or bandwidth of wireless calls. This capacity is a function of the maximum transmit power, frequency reuse, carrier to interference ratio, bit energy-to-noise ratio, effective bit-rate protocol and other criteria of the wireless link. To prevent the maximum power from being exceeded for a cell and thus damaging the transmitter, call and handoff admissions are blocked when the transmit power level exceeds established thresholds. Typically, the call blocking threshold is lower than the handoff blocking threshold to provide priority to existing calls entering the cell.

In operation, admission requests are processed as they are received. New call originations are blocked when the transmit power at the cell exceeds the call blocking threshold while handoff requests are still serviced normally. When the transmit power exceeds the higher handoff blocking threshold, both call origination and handoff requests are denied service.

SUMMARY OF THE INVENTION

The present invention provides a method and system for managing real-time bandwidth request in a wireless network that substantially eliminate or reduce problems and disadvantages associated with previous systems and methods. In particular, call origination, handoff, additional bandwidth and/or other suitable requests for bandwidth are differentiated based on user subscription levels to deliver differentiated tiered services to mobile users.

In accordance with one embodiment of the present invention, a method and system for managing bandwidth request in a wireless network includes receiving a request for a connection for bandwidth of a cell of a wireless network. A subscription level or other priority associated with the connection is determined. The request for the connection is processed based on the subscription level.

More specifically, in accordance with a particular embodiment of the present invention, the subscription level comprises a quality of service (QoS). In this embodiment, the request may be processed in order of its QoS-based priority.

Technical advantages of the present invention include providing an improved method and system for managing real-time bandwidth request in a wireless network. In a particular embodiment, the present invention provides QoS-based bandwidth allocation. Accordingly, bandwidth allocation priority is provided to users with higher priority subscriptions and wireless service providers are able to provide service packages based on differentiated wireless services.

Another technical advantage of one or more embodiments of the present invention includes providing QoS based queues for processing call origination, handoff and/or additional bandwidth requests in a wireless network. In particular, admission requests are queued based on their QoS priority with request in the higher priority queues given priority. Accordingly, use of bandwidth is maximized and limited bandwidth or power available during times of congestion is allocated to users subscribing to higher quality services.

Still another technical advantage of one or more embodiments of the present invention includes providing QoS based thresholds for processing call origination, handoff and/or additional bandwidth requests in a wireless network. In particular, requests are processed in the order received but using priority based thresholds. Accordingly, priority is provided to users with higher priority subscriptions. In this way, maximum usability and mobility is provided to users subscribing to and paying for higher quality of service.

Yet another technical advantage of one or more embodiments of the present invention includes tying the radio bandwidth allocation mechanisms in a wireless network to the Internet protocol (IP) quality mechanisms. In particular, the IP QoS mechanism is tied to the radio QoS mechanism such that users with higher subscription levels will observe lower bandwidth denial compared to users with lower subscription levels. As a result, wireless service providers can deliver differentiated tiered services to mobile users based on their QoS subscription.

Other technical advantages of the present invention will be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
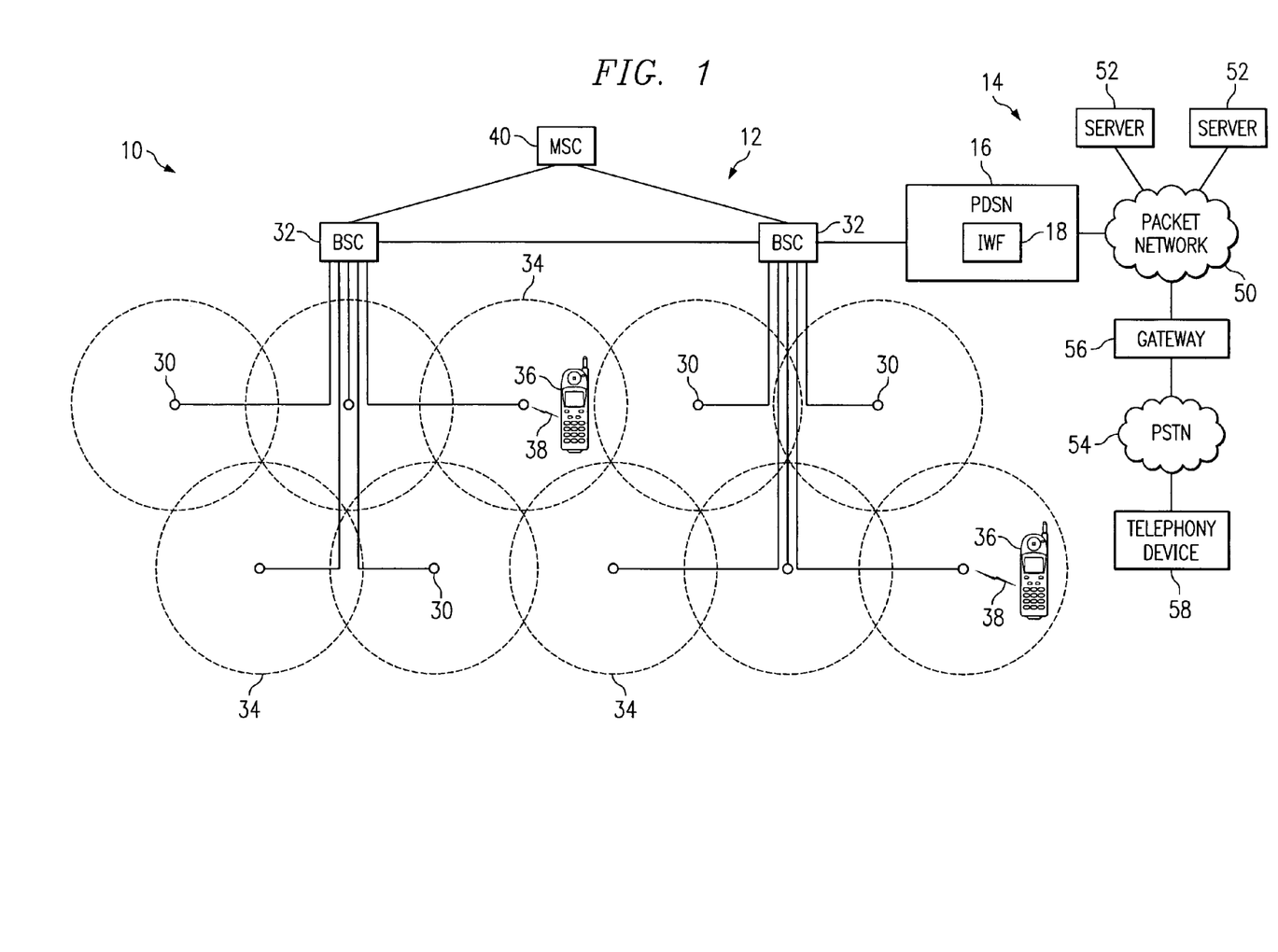
FIG. 1 is block diagram illustrating a communications network in accordance with one embodiment of the present invention.

FIG. 1 illustrates a communications system 10 in accordance with one embodiment of the present invention. In this embodiment, the communications system 10 includes a cellular wireless network in which terrestrial wireless transmissions originate in geographically delimited cells. It will be understood that the present invention may be used in connection with other suitable wireless networks.

Referring to FIG. 1, the communications system 10 includes a wireless network 12 connected to a wireline network 14 through a data gateway, such as a packet data serving node (PDSN) 16. The PDSN 16 comprises a router that directs traffic between the wireless and wireline networks 12 and 14. In one embodiment, the PDSN 16 includes a data interworking function (IWF) 18 that provides connectivity between the wireless and wireline networks 12 and 14 via circuit switched and packet switched wireless data protocols. It will be understood that connectivity between the wireline and wireless networks 12 and 14 may be otherwise suitably provided without departing from the scope of the present invention.

The wireless network 12 includes a number of base stations (BTSs) 30 connected to base station controllers (BSCs) 32. The BTSs 30 each cover a geographic region, or cell 34 of the wireless network 12 and communicate with mobile devices 36 in the cell 34. The mobile devices 36 may be cell phones, data phones, portable data devices, portable computers, handheld devices, handsets, portable network appliances or other suitable devices capable of communicating information over a wireless link 38.

The BSCs 32 are connected to each other, to the PDSN 16 and to a mobile switching center (MSC) 40. The BSCs 32 and the MSC 40 provide switch and soft handoff functionality for the wireless network 12. In this way, voice, video, data and other information is routed to and from the mobile devices 36 and connections are maintained with the mobile devices 36 as they move throughout the wireless network 12.

Wireless link 38 is a radio frequency (RF) link. The wireless link 38 may be based on established technologies or standards such as IS-54 (TDMA), IS-95 (CDMA), GSM and AMPS, 802.11 based WLAN, or more recent technology such as CDMA 2000 and W-CDMA or proprietary radio interfaces. In a particular embodiment, wireless link 38 comprises a code division multiple access (CDMA) link based on a CDMA standard and in which packets are segmented into radio frames for transmission over the wireless interface and reassembled by the receiving device to reconstitute the packets.

The wireline network 14 includes a packet network 50 connecting a number of servers 52 to each other and to the PDSN 16. The packet network 50 also connects the PDSN 16, and thus the wireless network 12 to the public switched telephone network (PSTN) 54 through gateway 56. Accordingly, mobile devices 36 may communicate through wireless network 12, packet network 50 and PSTN 54 with standard telephones, clients and computers using modems or digital subscriber line (DSL) connections or other telephony devices 58.

The data network 50 may be the Internet, intranet, extranet, or other suitable local or wide area network capable of communicating information between remote endpoints. For the Internet embodiment, information is transmitted in Internet protocol (IP) packets using transport control protocol/Internet protocol (TCP/IP). It will be understood that information may be transmitted in other suitable packets, including asynchronous transport mode (ATM) and other cells or datagrams.

The servers 52 may comprise voicemail servers (VMS), fax/modem servers, short message center (SMSC) servers, conferencing facilities, authentication, authorization, and accounting (AAA) servers, billing servers, home location registers (HLR), home subscriber servers (HSS), domain name servers (DNS), location servers and other suitable servers and functionality providing services to mobile devices 36 and/or to wireless and/or wireline connections in the communications system 10.

The servers 52 and/or other elements of the wireless or wireline networks 12 and 14 store subscriber level information for users of the wireless and/or wireline networks 12 and 14. The service level information includes service, quality and/or service level agreement (SLA) parameters for user connections. In a particular embodiment, the BSCs 32 store or access SLA databases including a QoS policy for each user. The QoS identifies a class of service (CoS) for user connections. The CoS identifies drops, delays, jitter, relative priority and other limits for the user connections. It will be understood that subscription level information may be otherwise stored and/or accessed for each bandwidth request for call set up, additional bandwidth or call handoff in the communications network 10.

Figure 2:
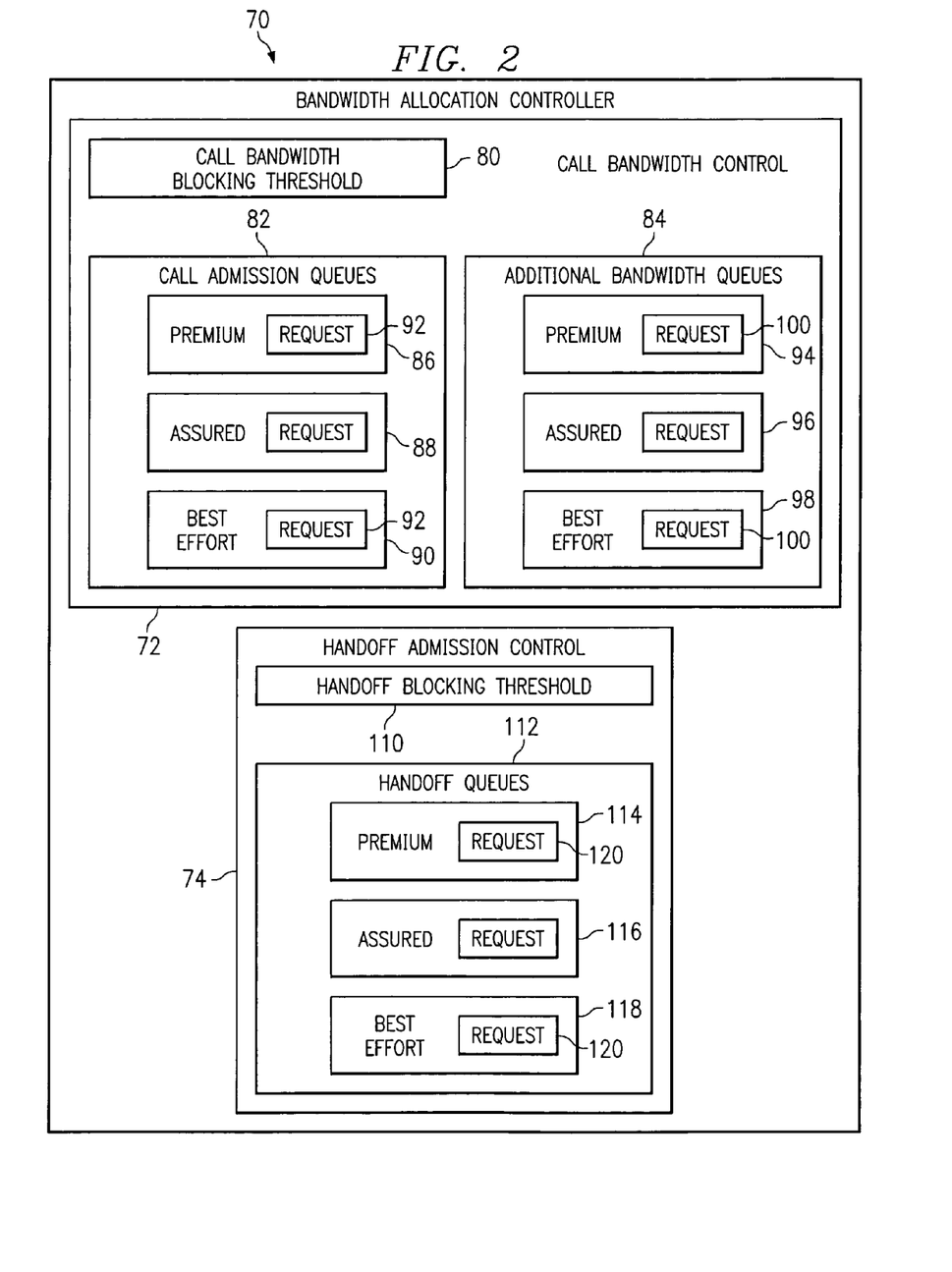
FIG. 2 is a block diagram illustrating details of a bandwidth allocation controller for the wireless network of FIG. 1 in accordance with one embodiment of the present invention.

FIG. 2 illustrates a bandwidth allocation controller 70 for the wireless network 12 in accordance with one embodiment of the present invention. In this embodiment, the bandwidth allocation controller 70 as well as other components of the communications system 10 comprises logic encoded in media for implementing bandwidth request control and other suitable functionality of the system. The logic comprises functional instructions for carrying out program task upon execution. The media comprises computer disks or other computer-readable media, application specific integrated circuits (ASIC), field programmable gate arrays (FPGA), digital signal processors (DSP), other suitable specific or general purpose processors, transmission media or other suitable media in which logic may be encoded and utilized.

Referring to FIG. 2, the bandwidth allocation controller 70 controls bandwidth request for connections in a cell 34 of the wireless network 12 to prevent the cell 34 from exceeding its maximum transmit power and thereby damaging its transmitter. The bandwidth allocation controller 70 includes a call bandwidth control 72 and a handoff admission control 74. The call bandwidth control 72 receives and processes call admission and additional bandwidth request for existing calls within the cell 34. The handoff admission control 74 receives and processes handoff requests for existing connections entering the cell 34. The request includes subscription level information, which may be the subscription level or information from which the subscription level of a connection associated with the request can be determined, and user and/or mobile identification.

The bandwidth controller 70 may be implemented in the BTS 30, BSC 32, MSC 40 or other suitable component of or coupled to the wireless network 12. The bandwidth controller may also be distributed in the wireless network 12. For example, the call bandwidth control 72 may reside at MSC 40 while the handoff admission control 74 resides at the BSCs 32. In addition, it will be understood that the bandwidth allocation controller 70 may implement a single bandwidth control including the functionality and elements of the call bandwidth control 72 and the handoff admission control 74. In this embodiment, blocking thresholds and queues may be shared for each type and/or category of bandwidth request or may be separated out for one or more types and/or categories of bandwidth requests. For example, higher priority request necessary to prevent dropping of an ongoing call may share a single higher blocking threshold while lower priority request for new calls desired to be made or additional bandwidth for ongoing calls may have a lower blocking threshold.

The call bandwidth control 72 includes a call bandwidth blocking threshold 80, call admission queues 82 and additional bandwidth queues 84. The call bandwidth blocking threshold 80 identifies a transmit power level of the cell over which a new call or additional bandwidth for an ongoing call or other suitable connection will be blocked. A connection may be a voice call, a video call, a data call, a combination of a voice video and/or data call or may comprise any other suitable information. In a particular embodiment, the call bandwidth blocking threshold may be eighty (80) percent of the maximum transmit power level of the cell 34.

The call admission queues 82 include a plurality of distinct queues each corresponding to a specific CoS, QoS or other subscription level priority parameter for a connection. The queues may be physically, logically or otherwise distinct such that request in each queue may be identified and processed based on a priority of the queues. Within each queue, the request may be processed in a FIFO or other suitable order.

In the illustrated embodiment, call admission queues 82 include a premium queue 86, an assured queue 88, and a best effort queue 90. Each queue is operable to queue a plurality of request 92. It will be understood that the call admission queues 82 may comprise other or different subscription-level based queues into which request 92 for admission of a call may be segregated and processed based on priority.

The additional bandwidth queues 84 also include a plurality of distinct queues each corresponding to a specific CoS, QoS or other subscription level priority parameter for connection. The queues may be physically, logically or otherwise distinct such that requests in each queue may be identified in process based on a priority of the queues. Within each queue, the request may be processed on a FIFO or other suitable order.

In the illustrated embodiment, the additional bandwidth queues 84 include a premium queue 94, an assured queue 96 and a best effort queue 98 each operable to queue one or more additional bandwidth requests 100. It will be understood that the additional bandwidth queues 84 may comprise other or different subscription-level based queues into which request 100 for additional bandwidth of a connection may be segregated and processed based on priority.

In operation, call admission and additional bandwidth requests 92 and 100 are received by the call bandwidth control 72 and forwarded to a corresponding one of the queues based on the type of the request and the subscription level for the connection to which the request corresponds. Requests in the premium queues 86 and 94 are processed first with requests in the assured queues 88 and 96 processed next followed by requests in the best effort queues 90 and 98. In a particular embodiment, call admission request of a priority are processed prior to the additional bandwidth request of the same priority. Thus, for example request 100 in the premium additional bandwidth queue 94 are processed after request 92 in the premium call admission queue 86 and request 100 in the best effort additional bandwidth queue 98 are processed only if all other requests in all other queues have been processed. After each request in a queue is processed, the call bandwidth control 72 may determine whether any new request 92 and/or 100 have been received in higher priority queues before processing the next highest priority queue or the next request in the currently processed queue. In this way, priority-based processing is maximized by the call bandwidth control 72.

The handoff admission control 74 includes a handoff blocking threshold 110 and handoff queues 112. The handoff blocking threshold 110 identifies the power level of the cell 34 over which handoff requests will be blocked. In one embodiment, the handoff blocking threshold 110 is independent of subscription level and thus the same for all handoff requests received by the cell 34. Typically, the handoff blocking threshold 110 is higher than that or those for call admission and additional bandwidth requests to provide priority to ongoing connections entering the cell 34. In a particular embodiment, the handoff blocking threshold 110 may be ninety (90) percent of the maximum transmit power of the cell 34.

The handoff queues 112 include a plurality of distinct queues each corresponding to a specific CoS, QoS or other subscription level priority parameter for a connection. The queues may be physically, logically or otherwise distinct such that requests in each queue may be identified and processed based on a priority of the queues. Within each queue, the request may be processed in a FIFO or other suitable order.

In the illustrated embodiment, handoff queues 112 include a premium handoff queue 114, an assured handoff queue 116 and a best effort queue 118 each operable to queue one or more handoff requests 120. It will be understood that handoff queues 112 may comprise other or different subscription level-based queues into which requests 120 for the handoff of connection may be segregated and processed based on priority.

In operation, handoff requests 120 are received by the handoff admission control 74 and forwarded to a corresponding one of the handoff queues 112 based on the subscription level for the connection to which the request corresponds. Requests in the premium queue 114 are processed first with requests in the assured queue 116 processed next followed by request in the best effort queue 118. Thus, for example, requests 120 in the best effort queue 118 are only processed if all other requests 120 in all other handoff queues 112 have already been processed. After each request 120 in a queue is processed, the handoff admission control 74 may determine whether any new requests 120 have been received in higher priority queues before proceeding to the next highest priority queue or a next request in the currently processed queue. In this way, priority-based processing is maximized by the handoff admission control 74.

The priority-based queues allow power, or bandwidth, of the cell to be maximized up to a single threshold level while still providing subscription-based priority to requests. In another embodiment, subscription-based blocking thresholds may be used to allow requests to be processed in the order received using a single queue but based on priority of the associated connection. It will be understood that one or the other of the priority-based call blocking thresholds or priority-based queues may be used by both the call admission control and handoff admission control 72 and 74. In yet another embodiment, a single control may be used for call admission, handoff and additional bandwidth requests with the requests being queued and allocated bandwidth blocking based on priority of the request and/or request type. In one or more and/or other embodiments, the priority-based processing of requests ties the bandwidth request servicing mechanisms to the network quality mechanisms such that users with higher subscription levels will observe higher allocated bandwidths compared to users with lower subscription levels. The QoS, CoS, or other network quality mechanism may be provided to the bandwidth allocation controller 70 during radio bandwidth reservation at the start of a call and or the start of the bandwidth request. Thus, the wireless service provider can deliver differentiated tiered services to mobile users based on their subscription level.

Figure 3:
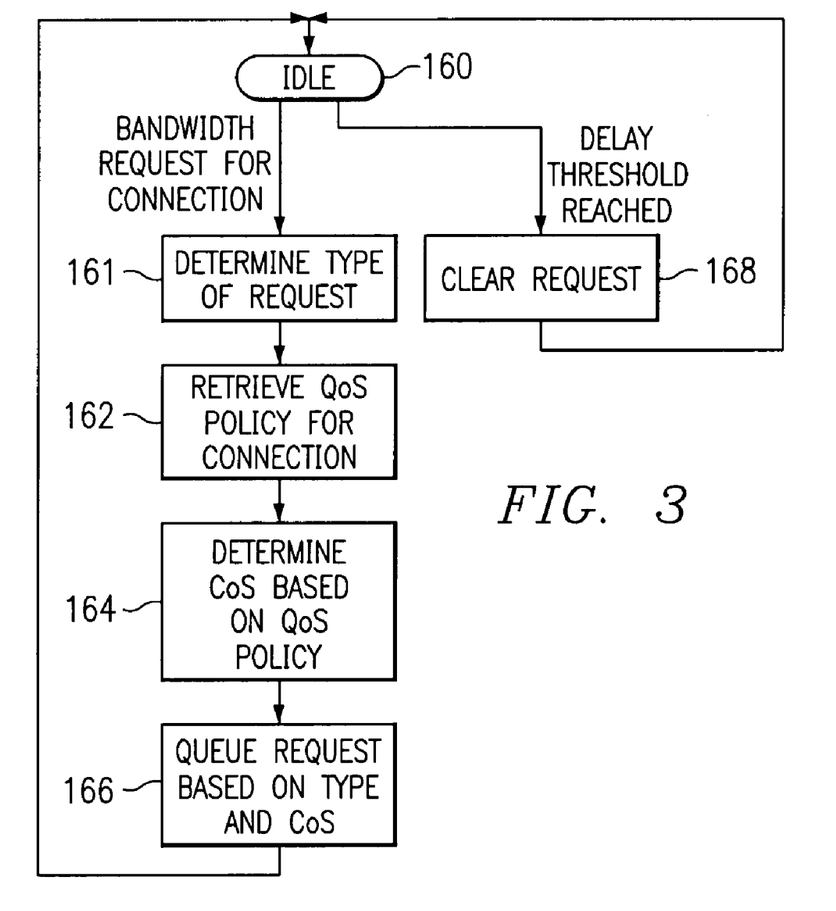
FIG. 3 is a flow diagram illustrating a method for queuing bandwidth request for allocation in accordance with one embodiment of the present invention.

FIG. 3 illustrates a method for queuing bandwidth request for allocation in a wireless network in accordance with one embodiment of the present invention. In this embodiment, a single bandwidth request control including the functionality, thresholds and queues of the call bandwidth control 72 and handoff admission control 74 is utilized.

Referring to FIG. 3, the method begins at state 160 in which the bandwidth request control is idle while there are no requests to be processed. In response to a bandwidth request for a connection, idle state 160 transitions to step. At step 162, the type of the request is determined. The request may be a handoff request, a call admission request, an additional bandwidth request or any other suitable type of request for bandwidth for a wireless connection. Proceeding to step 162, a QoS policy is retrieved for the connection. The QoS policy may be retrieved from a SLA or other suitable database or node of the communications network 10.

Next, at step 164, a CoS is determined for the connection based on the QoS policy. The CoS may be specified in the QoS policy or otherwise determined based on subscription or rate information in the QoS policy. At step 166, the request is queued into a corresponding one of the priority-based queues. Thus, for example, if the request is for handoff of a premium connection, the request is queued in the premium handoff queue 114 while if the request is for additional bandwidth of a best effort connection, the request is queued in the best effort queue 98.

Step 166 returns to idle state 160. In idle state 160, the bandwidth request control, in response to a request reaching a delay threshold, transitions to step 168. At step 168, the request is cleared. Step 168 transitions back to idle state 160. Thus, bandwidth requests are cleared as they reach a delay threshold. In another embodiment, expired request may be cleared periodically.

Figure 4A:
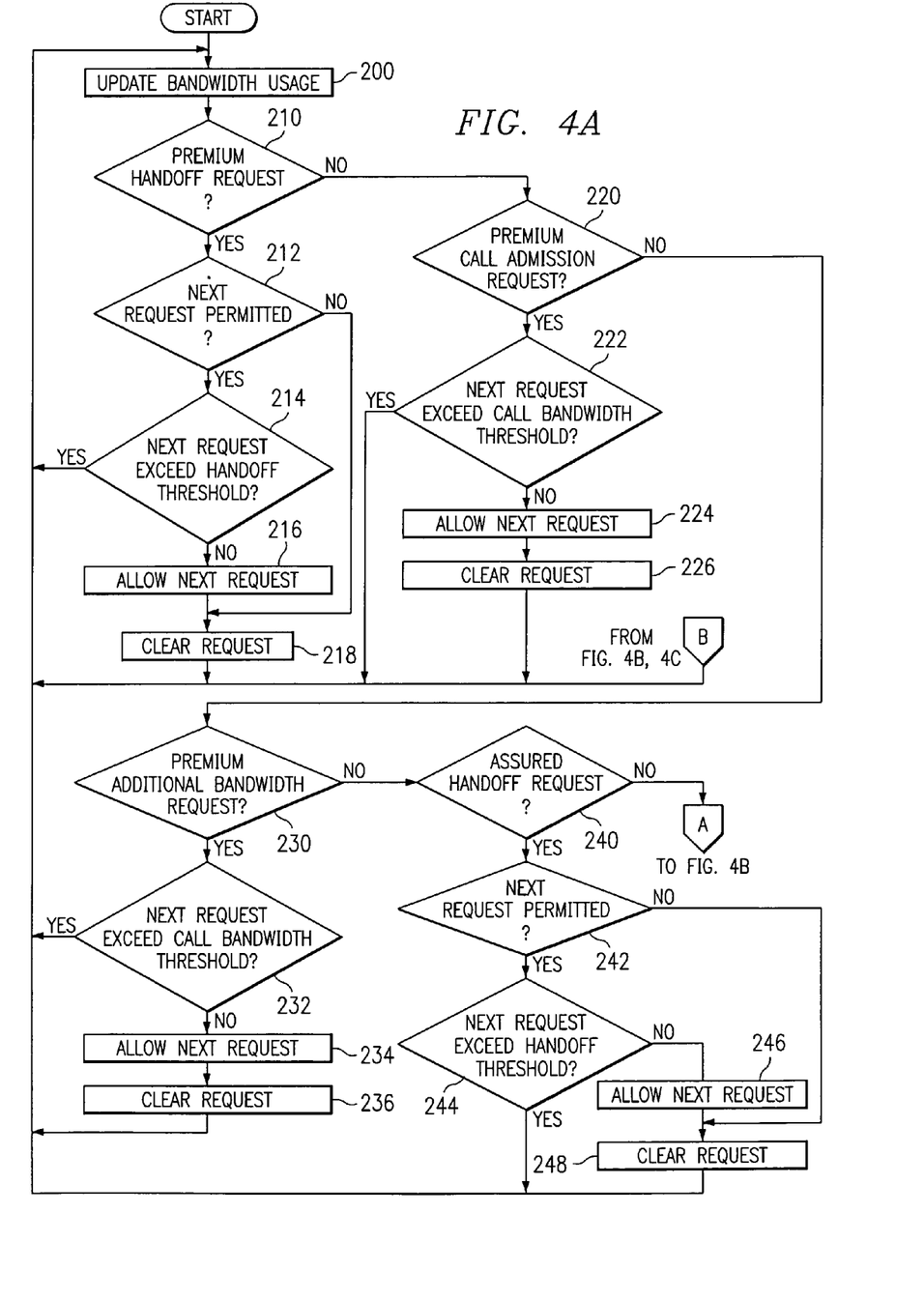
FIG. 4 is a block diagram illustrating a method for bandwidth allocation control in accordance with one embodiment of the present invention.
Figure 4B:
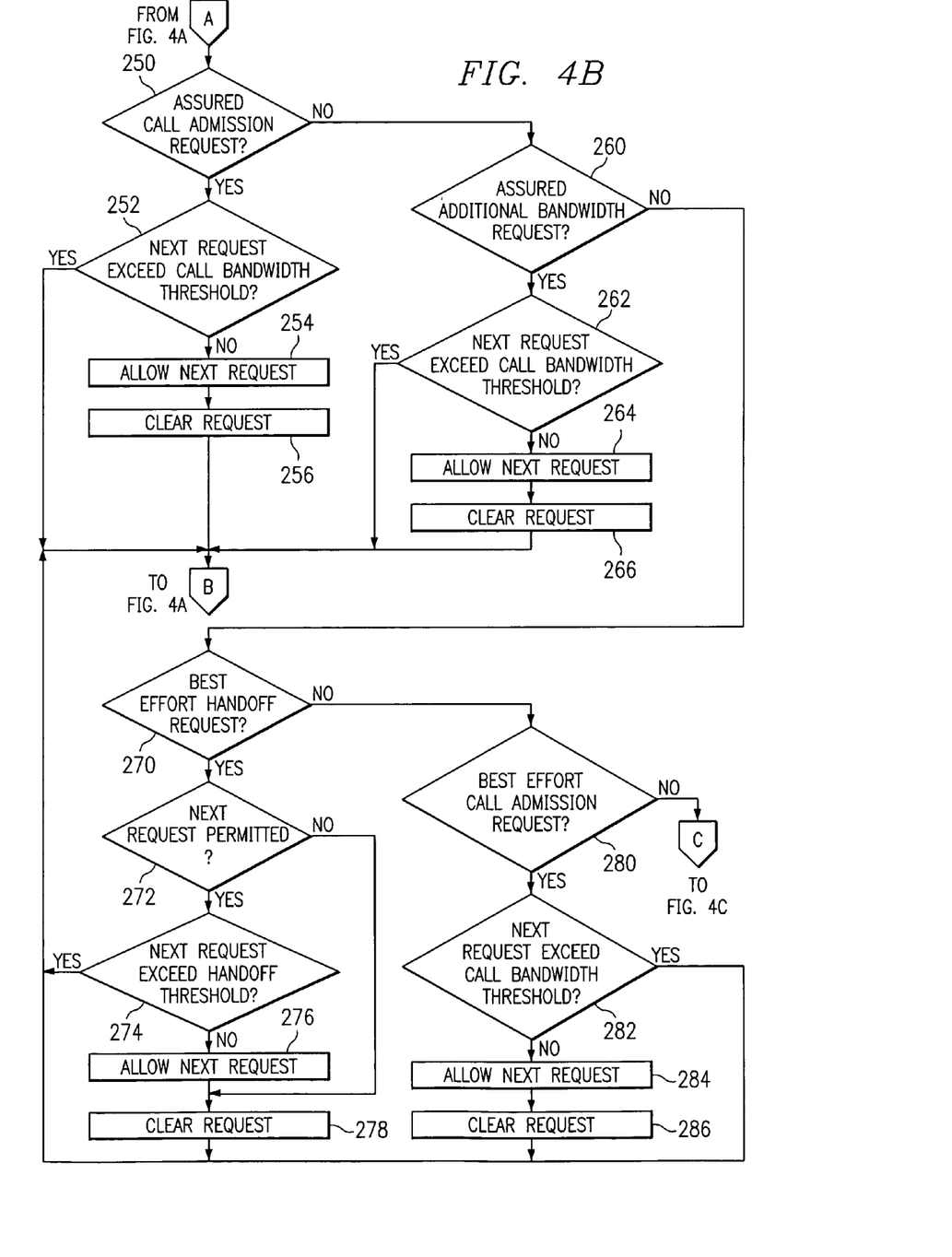
Figure 4C:
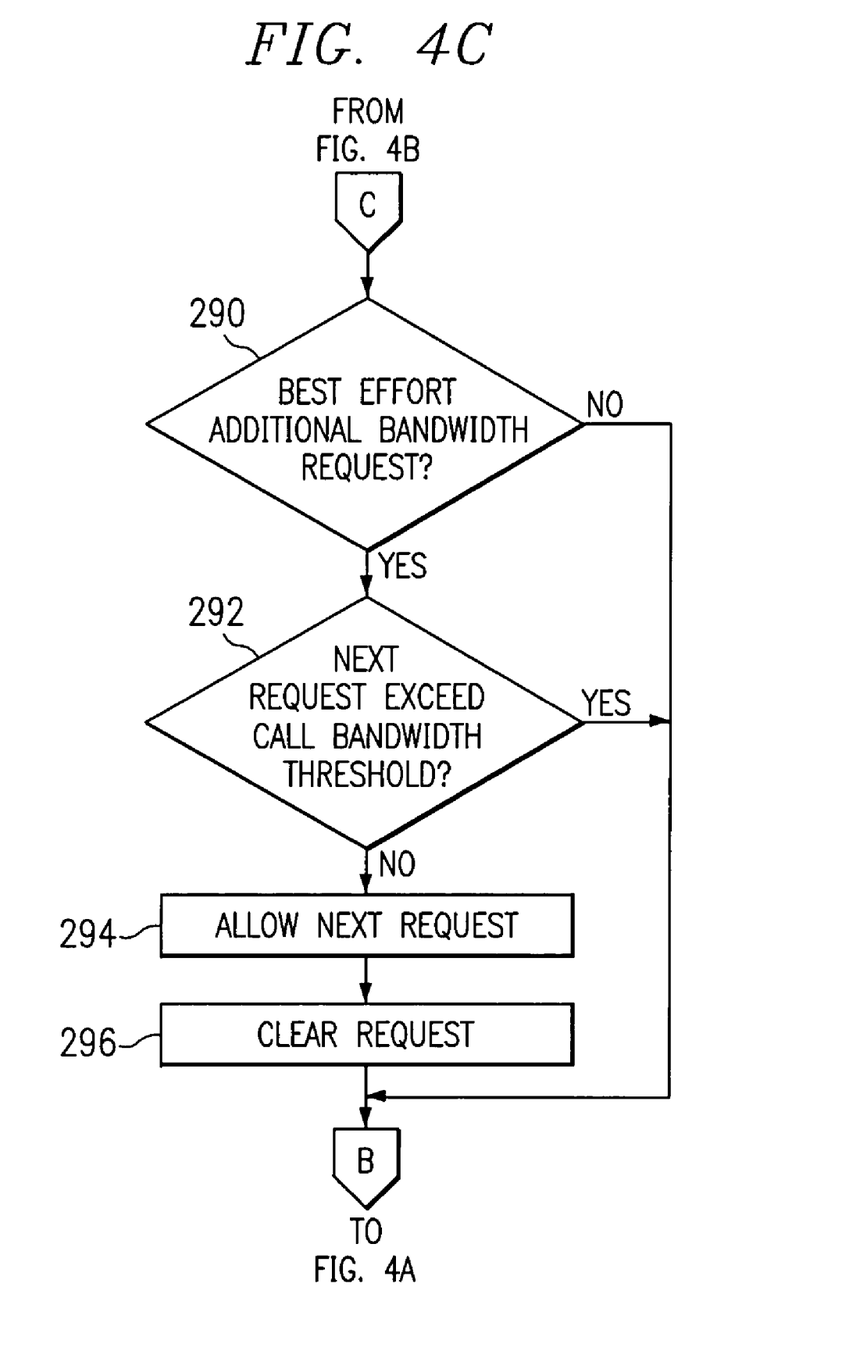

FIG. 4 illustrates a method for bandwidth allocation control in accordance with one embodiment of the present invention. In this embodiment, as previously described in connection with FIG. 3, a single bandwidth request control is used to process call handoff, call admission and additional bandwidth requests. The bandwidth request control includes the call bandwidth and call handoff admission controls 72 and 74 and/or the functionality, thresholds and queues of the controls 72 and 74.

Referring to FIG. 4, the method begins at step 200 in which bandwidth usage for the cell in which requests are being processed is updated to reflect the current, real-time bandwidth usage of the cell. The bandwidth usage may be updated by the BTSs 30 and passed to the bandwidth allocation controller 70 or determined and/or estimated by the controller.

Proceeding to the decisional step 210, the bandwidth request control determines whether the premium handoff queue 114, or other highest priority queue, contains any requests. If the premium handoff queue 114 includes one or more requests, the Yes branch of decisional step 210 leads to decisional step 212. At decisional step 212, it is determined whether the next request is permitted based on the SLA for the connection. If the connection is not subscribed to use bandwidth resources in the cell, the request is not permitted and the No branch of decisional step 212 leads to step 218. If the request is permitted, the Yes branch of decisional step 212 leads to step 214.

At decisional step 214, it is determined whether the handoff blocking threshold 110 would be exceeded if the next request is allowed. In one embodiment, the threshold is exceeded if current bandwidth usage plus the requested bandwidth exceeds the threshold. If the handoff blocking threshold 110 would not be exceeded by the request, the No branch of decisional step 214 leads to step 216 in which the next request is allowed. Step 216 leads to step 218 in which the request is cleared from the queue. Step 218 returns to step 200 in which the bandwidth usage for the cell is updated and processing of request in the queues begins again starting with the highest priority queues.

Returning to decisional step 212, if the next request is not permitted regardless of bandwidth usage, the No branch of decisional step 212 leads to step 218 where the request is cleared from the queue without further processing. Returning to decisional step 214, if the request will exceed the handoff blocking threshold 110, the Yes branch of decisional step 214 returns to step 200 without allowing the request. Thus, the request is only allowed or allowed to the extent that the corresponding threshold is not exceeded.

After all requests in the premium handoff queue 114 are processed, the No branch of decisional step 210 leads to decisional step 220. At decisional step 220, the bandwidth request control determines whether the premium call admission queue 86 contains any requests. If the premium call admission queue 86 contains one or more requests, the Yes branch of decisional step 220 leads to decisional step 222.

At decisional step 222, the bandwidth request control determines whether allowing the next request would cause the cell to exceed the call bandwidth blocking threshold 80. If the threshold is not exceeded, the No branch of decisional step 222 leads to step 224 in which the request is allowed. Next, at step 226, the allowed request is cleared. Step 226 returns to step 200 in which the bandwidth usage is again updated and processing of requests in the queues begins again starting with the highest priority queues.

Returning to decisional step 222, if the request would exceed the call bandwidth blocking threshold 80, the Yes branch of decisional step 222 returns to step 200 without allowing the next request. Thus, the request will only be allowed if doing so does not cause the corresponding blocking threshold to be exceeded.

After all requests in the premium call admission and higher priority queues are processed and/or cleared, the No branch of decisional step 220 leads to decisional step 230. At decisional step 230, the bandwidth request control determines whether the premium additional bandwidth queue 94 contains any requests. If the premium additional bandwidth queue 94 includes one or more requests, the Yes branch of decisional step 230 leads to decisional step 232.

At decisional step 232, the bandwidth request control determines whether allowing the next request in the queue 94 would cause the call bandwidth blocking threshold 80 to be exceeded. If the blocking threshold 80 would not be exceeded, the No branch of decisional step 232 proceeds to step 234 in which the next request is allowed. Next, at step 236, the request is cleared from the queue 94. Step 236 returns to step 200 in which the bandwidth usage is again updated to reflect the bandwidth allocated to the processed request plus any other bandwidth use changes in the cell.

Returning to step 232, if the next request would exceed the call bandwidth blocking threshold 80, the request is not allowed in the Yes branch of decisional step 232 returns to step 200 without allowance of the request. Accordingly, the next request will remain queued until sufficient bandwidth is available or until a delayed threshold is reached in which case it will be cleared.

After all requests in the premium queues are processed and/or cleared, the No branch of decisional step 230 leads to the decisional step 240 in which the bandwidth request control determines whether the assured handoff queue 116, or other highest priority queue, contains any requests. If the assured handoff queue 116 includes one or more requests, the Yes branch of decisional step 240 leads to decisional step 242. At decisional step 242, it is determined whether the next request is permitted based on the SLA for the connection. If the connection is not subscribed to use bandwidth resources in the cell, the request is not permitted and the No branch of decisional step 242 leads to step 248. If the request is permitted, the Yes branch of decisional step 242 leads to step 244.

At decisional step 244, it is determined whether the handoff blocking threshold 110 would be exceeded if the next request is allowed. In one embodiment, the threshold is exceeded if current bandwidth usage plus the requested bandwidth exceeds the threshold. If the handoff blocking threshold 110 would not be exceeded by the request, the No branch of decisional step 244 leads to step 246 in which the next request is allowed. Step 246 leads to step 248 in which the request is cleared from the queue. Step 248 returns to step 200 in which the bandwidth usage for the cell is updated.

Returning to decisional step 242, if the next request is not permitted regardless of bandwidth usage, the No branch of decisional step 242 leads to step 248 where the request is cleared from the queue without further processing. Returning to decisional step 244, if the request will exceed the handoff threshold 110, the Yes branch of decisional step 244 returns to step 200 without allowing the request. Thus, the request is only allowed or allowed to the extent that the corresponding threshold is not exceeded.

After all requests in the assured handoff and higher priority queues are processed and/or cleared, the No branch of decisional step 240 leads to decisional step 250. At decisional step 250, the bandwidth request control determines whether the assured call admission queue 88 contains any requests. If the assured call admission queue 88 contains one or more requests, the Yes branch of decisional step 250 leads to decisional step 252.

At decisional step 252, the bandwidth request control determines whether allowing the next request would cause the cell to exceed the call bandwidth blocking threshold 80. If the threshold is not exceeded, the No branch of decisional step 252 leads to step 254 in which the request is allowed. Next, at step 256, the allowed request is cleared. Step 256 returns to step 200 in which the bandwidth usage is again updated and processing of requests in the queues begins again starting with the highest priority queues.

Returning to decisional step 252, if the request would exceed the call bandwidth blocking threshold 80, the Yes branch of decisional step 252 returns to step 200 without allowing the next request. Thus, the request will only be allowed if doing so does not cause the corresponding blocking threshold to be exceeded.

After all requests in the assured call admission and higher priority queues are processed and/or cleared, the No branch of decisional step 250 leads to decisional step 260. At decisional step 260, the bandwidth request control determines whether the assured additional bandwidth queue 96 contains any requests. If the assured additional bandwidth queue 96 includes one or more requests, the Yes branch of decisional step 260 leads to decisional step 262.

At decisional step 262, the bandwidth request control determines whether allowing the next request in the queue 96 would cause the call bandwidth blocking threshold 80 to be exceeded. If the blocking threshold 80 would not be exceeded, the No branch of decisional step 262 proceeds to step 264 in which the next request is allowed. Next, at step 266, the request is cleared from the queue 96. Step 266 returns to step 200 in which the bandwidth usage is again updated to reflect the bandwidth allocated to the processed request plus any other bandwidth use changes in the cell.

Returning to step 262, if the next request would exceed the call bandwidth blocking threshold 80, the request is not allowed in the Yes branch of decisional step 262 returns to step 200 without allowance of the request. Accordingly, the next request will remain queued until sufficient bandwidth is available or until a delayed threshold is reached in which case it will be cleared.

After all premium and assured requests are processed and/or queued, the No branch of decisional step 260 leads to the decisional step 270 in which the bandwidth request control determines whether the best effort handoff queue 118 contains any requests. If the best effort handoff queue 114 includes one or more requests, the Yes branch of decisional step 270 leads to decisional step 212. At decisional step 272, it is determined whether the next request is permitted based on the SLA for the connection. If the connection is not subscribed to use bandwidth resources in the cell, the request is not permitted and the No branch of decisional step 272 leads to step 278. If the request is permitted, the Yes branch of decisional step 272 leads to step 274.

At decisional step 274, it is determined whether the handoff blocking threshold 110 would be exceeded if the next request is allowed. In one embodiment, the threshold is exceeded if current bandwidth usage plus the requested bandwidth exceeds the threshold. If the handoff blocking threshold 110 would not be exceeded by the request, the No branch of decisional step 274 leads to step 276 in which the next request is allowed. Step 276 leads to step 278 in which the request is cleared from the queue. Step 278 returns to step 200 in which the bandwidth usage for the cell is updated.

Returning to decisional step 272, if the next request is not permitted regardless of bandwidth usage, the No branch of decisional step 272 leads to step 278 where the request is cleared from the queue without further processing. Returning to decisional step 274, if the request will exceed the handoff blocking threshold 110, the Yes branch of decisional step 274 returns to step 200 without allowing the request. Thus, the request is only allowed or allowed to the extent that the corresponding threshold is not exceeded.

After all requests in the best effort handoff and higher priority queues are processed and/or cleared, the No branch of decisional step 270 leads to decisional step 280. At decisional step 280, the bandwidth request control determines whether the best effort call admission queue 90 contains any requests. If the best effort call admission queue 90 contains one or more requests, the Yes branch of decisional step 280 leads to decisional step 282.

At decisional step 282, the bandwidth request control determines whether best effort allowing the next request would cause the cell to exceed the call bandwidth blocking threshold 80. If the threshold is not exceeded, the No branch of decisional step 282 leads to step 284 in which the request is allowed. Next, at step 286, the allowed request is cleared. Step 286 returns to step 200 in which the bandwidth usage is again updated and processing of requests in the queues begins again starting with the highest priority queues.

Returning to decisional step 282, if the request would exceed the call bandwidth blocking threshold 80, the Yes branch of decisional step 282 returns to step 200 without allowing the next request. Thus, the request will only be allowed if doing so does not cause the corresponding blocking threshold to be exceeded.

After all requests in the higher priority queues are processed, the No branch of decisional step 280 leads to decisional step 290. At decisional step 290, the bandwidth request control determines whether the best effort additional bandwidth queue 98 contains any requests. If the best effort additional bandwidth queue 98 includes one or more requests, the Yes branch of decisional step 290 leads to decisional step 292.

At decisional step 292, the bandwidth request control determines whether allowing the next request in the queue 98 would cause the call bandwidth blocking threshold 80 to be exceeded. If the blocking threshold 80 would not be exceeded, the No branch of decisional step 292 proceeds to step 294 in which the next request is allowed. Next, at step 296, the request is cleared from the queue 98. Step 296 returns to step 200 in which the bandwidth usage is again updated to reflect the bandwidth allocated to the process request plus any other bandwidth use changes in the cell.

Returning to step 292, if the next request would exceed the call bandwidth blocking threshold 80, the request is not allowed in the Yes branch of decisional step 292 returns to step 200 without allowance of the request. Accordingly, the next request will remain queued until sufficient bandwidth is available or until a delayed threshold is reached in which case it will be cleared.

In this way, requests are processed based on priority. It will be understood that if sufficient bandwidth is not available for a request, the request may be granted at a reduced bandwidth such that the corresponding blocking threshold is not exceeded or that the queues may be searched for highest priority allowable request. It will be further understood that the queue processing order may be altered to support a suitable processing scheme.

Although the present invention has been described with several embodiment, various changes and modifications may be suggested to one skilled in the art. It is intended that the present invention encompass such changes and modifications as fall within the scope of the appended claims and their equivalents.

What is claimed is:

1. A method for managing real-time bandwidth requests in a wireless network, comprising:
   receiving a plurality of bandwidth requests each for a connection to a cell of a wireless network, each request selected from the group consisting of a call admission request, an additional bandwidth request, and a handoff request, each received request including subscription level information comprising a class of service (CoS);
   determining a priority associated with the connection based on the subscription level information;
   queuing each of the requests in one of a plurality of queues corresponding to the CoS for the connection based on the subscription level information;
   clearing from the queues any request reaching a delay threshold; and
   processing the received requests in the queues by queue beginning with a queue corresponding to a highest priority CoS and in a descending order of CoS priority to provide bandwidth to corresponding connections until available bandwidth is exhausted.

2. The method of claim 1, wherein the priority comprises a subscription level.

3. The method of claim 1, wherein the subscription level comprises a quality of service (QoS) and processing the request based on the QoS comprises processing the request in an order based on the QoS.

4. The method of claim 3, processing the request in the order based on the QoS comprising:
   retrieving a QoS policy for the connection;
   determining the CoS for the connection based on the QoS policy;
   queuing the request in a corresponding CoS queue; and
   processing the request after requests in higher priority CoS queues have been processed.

5. The method of claim 4, further comprising clearing the request after a delay threshold for the request is reached.

6. The method of claim 1, wherein at least one of the plurality of requests is a call origination request.

7. The method of claim 1, wherein at least one of the plurality of requests is a handoff request.

8. The method of claim 1, wherein the connection is an existing connection and at least one of the plurality of requests is an additional bandwidth request for the connection.

9. The method of claim 1, further comprising processing each request by determining whether allowing each request would exceed a blocking threshold for the cell.

10. The method of claim 9, wherein the cell comprises a plurality of blocking thresholds and further comprising processing each request by determining whether allowing each request would exceed a corresponding blocking threshold.

11. The method of claim 10, wherein the cell comprises a call bandwidth blocking threshold for call admission and additional bandwidth requests and a handoff blocking threshold for call handoff requests.

12. A system for managing real-time bandwidth request in a wireless network, comprising:
   means for receiving a plurality of bandwidth requests each for a connection to a cell of a wireless network, each request selected from the group consisting of a call admission request, an additional bandwidth request, and a handoff request, each received request including subscription level information comprising a class of service (CoS);
   means for determining a priority associated with the connection based on the subscription level information;
   means for queuing each of the requests in one of a plurality of queues corresponding to the CoS for the connection based on the subscription level information;
   means for clearing from the queues any request reaching a delay threshold; and
   means for processing the requests in the queues by queue beginning with a queue corresponding to a highest priority CoS and in a descending order of CoS priority to provide bandwidth to corresponding connections until available bandwidth is exhausted.

13. The system of claim 12, wherein the priority comprises a subscription level.

14. The system of claim 12, wherein the subscription level comprises a quality of service (QoS) and the means for processing the request based on the QoS comprises means for processing the request in an order based on the QoS.

15. The system of claim 14, the means for processing the request in the order based on the QoS comprising:
   means for retrieving a QoS policy for the connection;
   means for determining the CoS for the connection based on the QoS policy;
   means for queuing the request in a corresponding CoS queue; and
   means for processing the request after requests in higher priority CoS queues have been processed.

16. The system of claim 15, further comprising means for clearing the request after a delay threshold for the request is reached.

17. The system of claim 12, wherein at least one of the plurality of requests is a call origination request.

18. The system of claim 12, wherein at least one of the plurality of requests is a handoff request.

19. The system of claim 12, wherein the connection is an existing connection and at least one of the plurality of requests is an additional bandwidth request for the connection.

20. The system of claim 12, further comprising processing each request by determining whether allowing each request would exceed a blocking threshold for the cell.

21. The system of claim 20, wherein the cell comprises a plurality of blocking thresholds and further comprising processing each request by determining whether allowing each request would exceed a corresponding blocking threshold.

22. The system of claim 21, wherein the cell comprises a call bandwidth blocking threshold for call admission and additional bandwidth requests and a handoff blocking threshold for call handoff requests.

23. A system for managing real-time bandwidth request in a wireless network, comprising:
    logic encoded in media; and
    the logic operable to:
        receive a plurality of bandwidth requests each for a connection to a cell of a wireless network, each request selected from the group consisting of a call admission request, an additional bandwidth request, and a handoff request, each received request including subscription level information comprising a class of service (CoS);
        determine a priority associated with the connection based on the subscription level information;
        queue each of the requests in one of a plurality of queues corresponding to the CoS for the connection based on the subscription level information;
        clear from the queues any request reaching a delay threshold; and
        process the received requests in the queues by queue beginning with a queue corresponding to a highest priority CoS and in a descending order of CoS priority to provide bandwidth to corresponding connections until available bandwidth is exhausted.

24. The system of claim 23, wherein the priority comprises a subscription level.

25. The system of claim 23, wherein the subscription level comprises a quality of service (QoS), the logic operable to process the received request based on the QoS by processing the received request in an order based on the QoS.

26. The system of claim 25, the logic operable to process the received request in the order based on the QoS by retrieving a QoS policy for the connection, determining the CoS for the connection based on the QoS policy, queuing the received request in a corresponding CoS queue and processing the received request after requests in higher priority CoS queues have been processed.

27. The system of claim 26, the logic further operable to clear the received request after a delay threshold for the request is reached.

28. The system of claim 23, wherein the received request is a call origination request.

29. The system of claim 23, wherein the received request is a handoff request.

30. The system of claim 23, wherein the connection is an existing connection and the request is an additional bandwidth request for the connection.

31. The system of claim 23, the logic further operable to process the received request by determining whether allowing the received request would exceed a blocking threshold for the cell.

32. The system of claim 31, wherein the cell comprises a plurality of blocking thresholds and the logic is further operable to process the received request by determining whether allowing the request would exceed a corresponding blocking threshold.

33. The system of claim 32, wherein the cell comprises a call bandwidth blocking threshold for call admission and additional bandwidth requests and a handoff blocking threshold for call handoff requests.

34. A method for admission control in a wireless network, comprising:
    receiving a call admission request for admission of a first connection to a cell of a wireless network;
    retrieving a quality of service (QoS) policy for the first connection;
    determining a class of service (CoS) for the first connection based on the QoS policy;
    queuing the call admission request in a call queue corresponding to the CoS of the first connection;
    clearing the call admission request if a delayed threshold for the call admission request is reached;
    admitting the first connection if a transmit power of the cell is less than a call bandwidth blocking threshold after call admission requests in queues corresponding to a higher priority CoS have been processed and after previously received call admission request in a same queue have been processed;
    receiving a handoff request for admission of a second connection to the cell of the wireless network;
    retrieving a QoS policy for the second connection;
    determining a CoS for the second connection based on the QoS policy;
    queuing the handoff request in a handoff queue corresponding to the CoS of the second connection;
    clearing the handoff request if a delay threshold for the handoff request is reached; and
    admitting the second connection if a transmit power of the cell is less than a handoff blocking threshold after handoff requests in queues corresponding to a higher priority CoS have been processed and after previously received handoff requests in a same queue have been processed.

35. The method of claim 34, wherein the CoS comprises one of a premium CoS, assured CoS and a best effort CoS.

36. An admission controller for a wireless network node, comprising:
    a call bandwidth control including a plurality of disparate class of service (CoS) queues and operable to queue each call admission and additional bandwidth request in a corresponding one of the CoS queues and to process call admission and additional bandwidth requests from the CoS queues by queue in order of CoS priority of the queues; and
    a handoff admission control comprising a plurality of disparate CoS queues and operable to queue each handoff request in a corresponding one of the CoS queues and to process handoff requests from the CoS queues by queue in order of a CoS priority of the queues.

* * * * *

UNITED STATES PATENT AND TRADEMARK OFFICE
CERTIFICATE OF CORRECTION

| | | |
|---|---|---|
| PATENT NO. | : 6,978,144 B1 | Page 1 of 1 |
| APPLICATION NO. | : 09/839833 | |
| DATED | : December 20, 2005 | |
| INVENTOR(S) | : Ojas T. Choksi | |

It is certified that error appears in the above-identified patent and that said Letters Patent is hereby corrected as shown below:

Title Page, and Col. 1, Line 2 Title (54), after "bandwith", insert -- Request --.

Signed and Sealed this

Twenty-third Day of January, 2007

JON W. DUDAS
*Director of the United States Patent and Trademark Office*